United States Patent
Higuchi et al.

(10) Patent No.: US 6,665,005 B1
(45) Date of Patent: Dec. 16, 2003

(54) ELECTRONIC IMAGE PICKUP APPARATUS

(75) Inventors: Tatsuji Higuchi, Akiruno (JP); Kenichi Aoki, Yokohama (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 09/149,619

(22) Filed: Sep. 8, 1998

(30) Foreign Application Priority Data

Sep. 9, 1997 (JP) ............................................. 9-244376

(51) Int. Cl.⁷ ............................ H04N 9/04; H04N 5/225
(52) U.S. Cl. .................. 348/207.99; 348/272; 348/340; 348/362; 396/443; 396/448
(58) Field of Search .................. 348/296, 362, 348/340, 272, 207.99; 396/457, 443, 448

(56) References Cited

U.S. PATENT DOCUMENTS

| | | | | |
|---|---|---|---|---|
| 3,595,152 A | * | 7/1971 | Douglas | ...................... 396/460 |
| 4,341,454 A | * | 7/1982 | Baker et al. | ................. 116/213 |
| 4,558,368 A | * | 12/1985 | Aoki et al. | .............. 348/221.1 |
| 5,079,575 A | * | 1/1992 | Nii et al. | ...................... 359/694 |
| 5,444,485 A | * | 8/1995 | Uchioke et al. | ......... 348/240.3 |
| 5,701,537 A | * | 12/1997 | Akimoto et al. | ............ 396/463 |
| 5,978,602 A | * | 11/1999 | Toyofuku et al. | ........... 396/132 |
| 2001/0038414 A1 | * | 11/2001 | Hofer et al. | ................. 348/207 |

FOREIGN PATENT DOCUMENTS

| | | | | |
|---|---|---|---|---|
| JP | 407159852 A | * | 12/1993 | ............ G03B/9/10 |
| JP | 407174956 A | * | 7/1995 | ............ G02B/7/04 |
| JP | 411284905 A | * | 10/1999 | .......... H04N/5/238 |
| JP | 02000078593 A | * | 3/2000 | ............ H04N/9/07 |

* cited by examiner

Primary Examiner—Andrew Christensen
Assistant Examiner—Eric Wisdahl
(74) Attorney, Agent, or Firm—Volpe and Koenig, P.C.

(57) ABSTRACT

An electronic image pickup apparatus comprises a shutter having a shielding member which can be inserted into or removed from an optical path of an optical system for forming an image of an object on a light receiving surface of an image pickup element, an inserting/removing mechanism for inserting or removing the shielding member into or from the optical path, a driver for driving the inserting/removing mechanism, and a manipulator for operating the inserting/removing mechanism by a driving system other than the driver.

9 Claims, 3 Drawing Sheets

ELECTRONIC IMAGE PICKUP APPARATUS

BACKGROUND OF THE INVENTION

The present invention relates to an electronic image pickup apparatus, such as an electronic camera, comprising a color image pickup element for generating a color image signal, a zooming lens for changing the magnification of an image of the color image pickup element on a photoelectric conversion surface, and a zooming lens frame for supporting the zooming lens.

In general, a color image pickup element in an electronic image pickup apparatus, such as an electronic camera, has a color filter provided near the surface of the element. When the color filter is exposed to external light for a long time, the color tone is deteriorated, that is, so-called discoloration occurs. Therefore, the color of the photographed image is imbalanced.

A silver salt film camera does not suffer from the aforementioned problem of discoloration, since it employs a system in which the shutter is closed when the power is OFF (normally close system). However, an electronic image pickup camera, e.g., a digital camera, perform photometry, focus detection and photographing monitor on the basis of light incident on an image pickup element. Therefore, the mechanical shutter is open for a long time, and closed only at the photographing moment. The electronic image pickup apparatus employs a system in which the shutter is open when the shutter is not driven (normally open system), so that the power can be saved.

Thus, in the electronic image pickup apparatus, since the time in which the shutter is open is considerably longer as compared to the case of a silver salt film camera, the problem of discoloration of the color filter arises.

To solve the problem, various means have been proposed to mechanically shield the image pickup element from external light in the non-photographing time. For example, Jpn. Pat. Appln. KOKOKU Publication No. 62-43636 discloses a mechanism for inserting a light shield plate for use in white balance adjustment into an image pickup lens in cooperation with a power operation member.

Recently, however, automatic white balance adjustment has become a main current. Therefore, to use a light shielding plate for white balance adjustment also as a shutter plate for preventing discoloration of the color filter as disclosed in the above publication, the light shielding plate for the white balance adjustment, which is actually unnecessary, must be incorporated in the apparatus. This is considerably disadvantageous in space and cost. Further, since the mechanism disclosed in the above publication is a system for mechanically moving the light shielding plate in cooperation with the power operation member, a number of restrictions in mechanism and arrangement are imposed. For this reason, it is difficult to apply such a plate to a compact device, for example, a digital camera.

BRIEF SUMMARY OF THE INVENTION

An object of the present invention is to provide an electronic image pickup apparatus having means for surely preventing, with a simple structure, discoloration of the color filter attached to the image pickup element, while the shutter plate for exposure control can be shut without operating the shutter driving source, when a photographing operation is completed.

To achieve the above object, the electronic image pickup apparatus of the present invention has the following constitution. The features of the present invention other than the following will be clarified in the description of the embodiments.

An electronic image pickup apparatus of the present invention comprises a shutter having: a shielding member which can be inserted into or removed from an optical path of an optical system for forming an image of an object on a light receiving surface of an image pickup element; an inserting/removing mechanism for inserting or removing the shielding member into or from the optical path; a driver for driving the inserting/removing mechanism; and a manipulator for operating the inserting/removing mechanism by a driving system other than the driver.

DETAILED DESCRIPTION OF THE INVENTION

Embodiment

Figure 1:
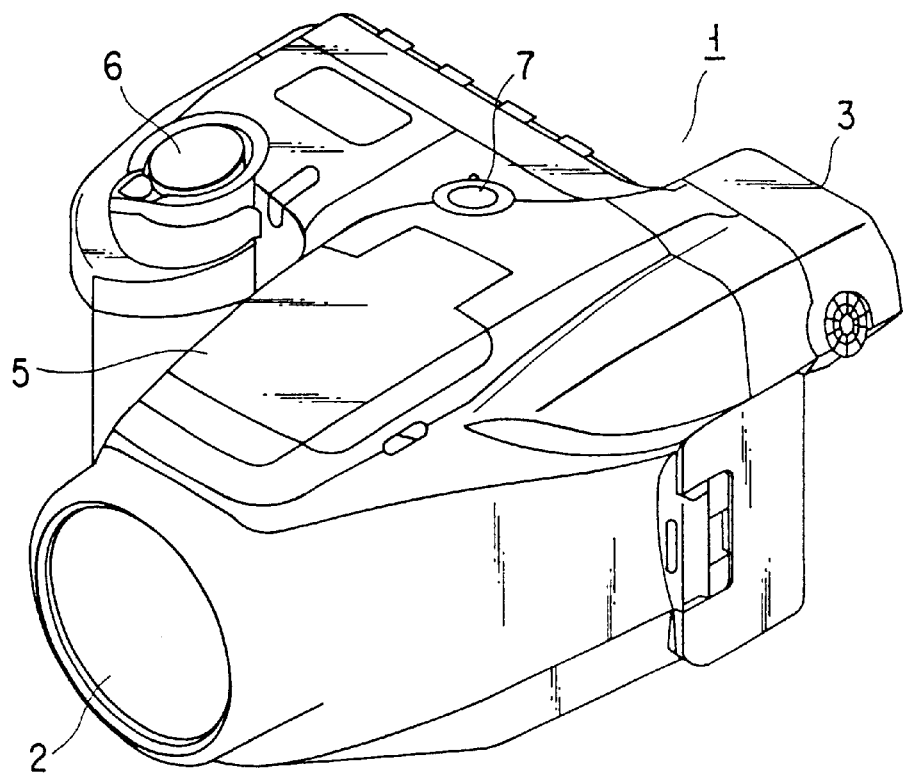
FIG. 1 is a front, perspective view of the outward appearance of an electronic image pickup apparatus according to an embodiment of the present invention.
Figure 2:
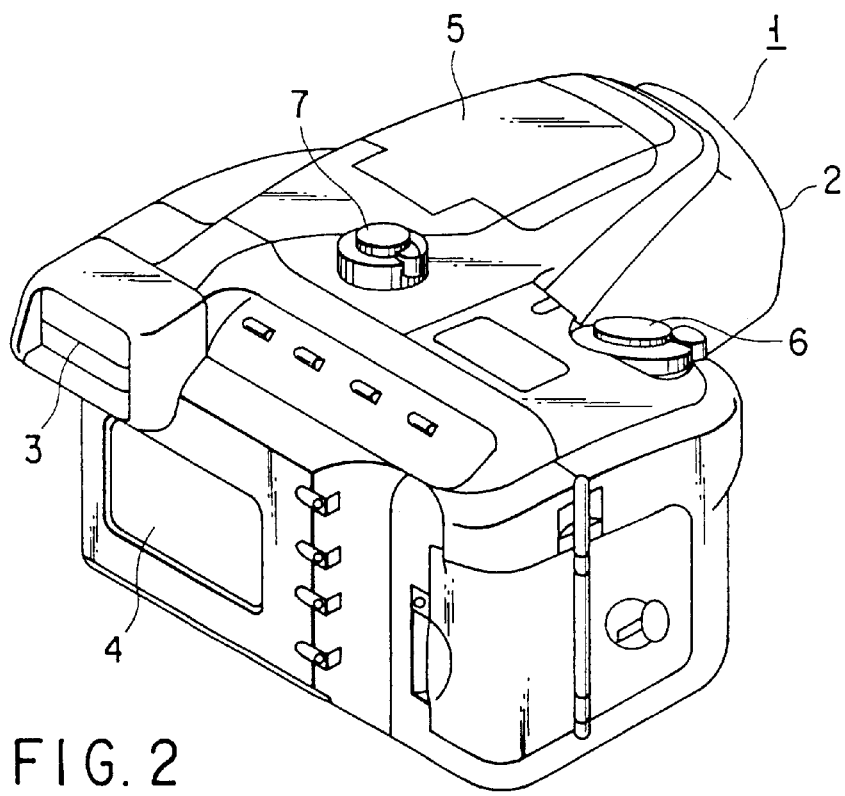
FIG. 2 is a back, perspective view of the outward appearance of the electronic image pickup apparatus according to the embodiment of the present invention.

In FIGS. 1 and 2, a reference numeral 1 indicates a camera body; 2, an optical system (including optical components such as a zoom lens); 3, a finder; 4, a liquid crystal display unit for monitoring; 5, a stroboscope; 6, a release button; and 7, a power switch. Hereinafter, a lens barrel unit including the optical system 2, which is the main part of the present invention, will be described in detail.

Figure 3:
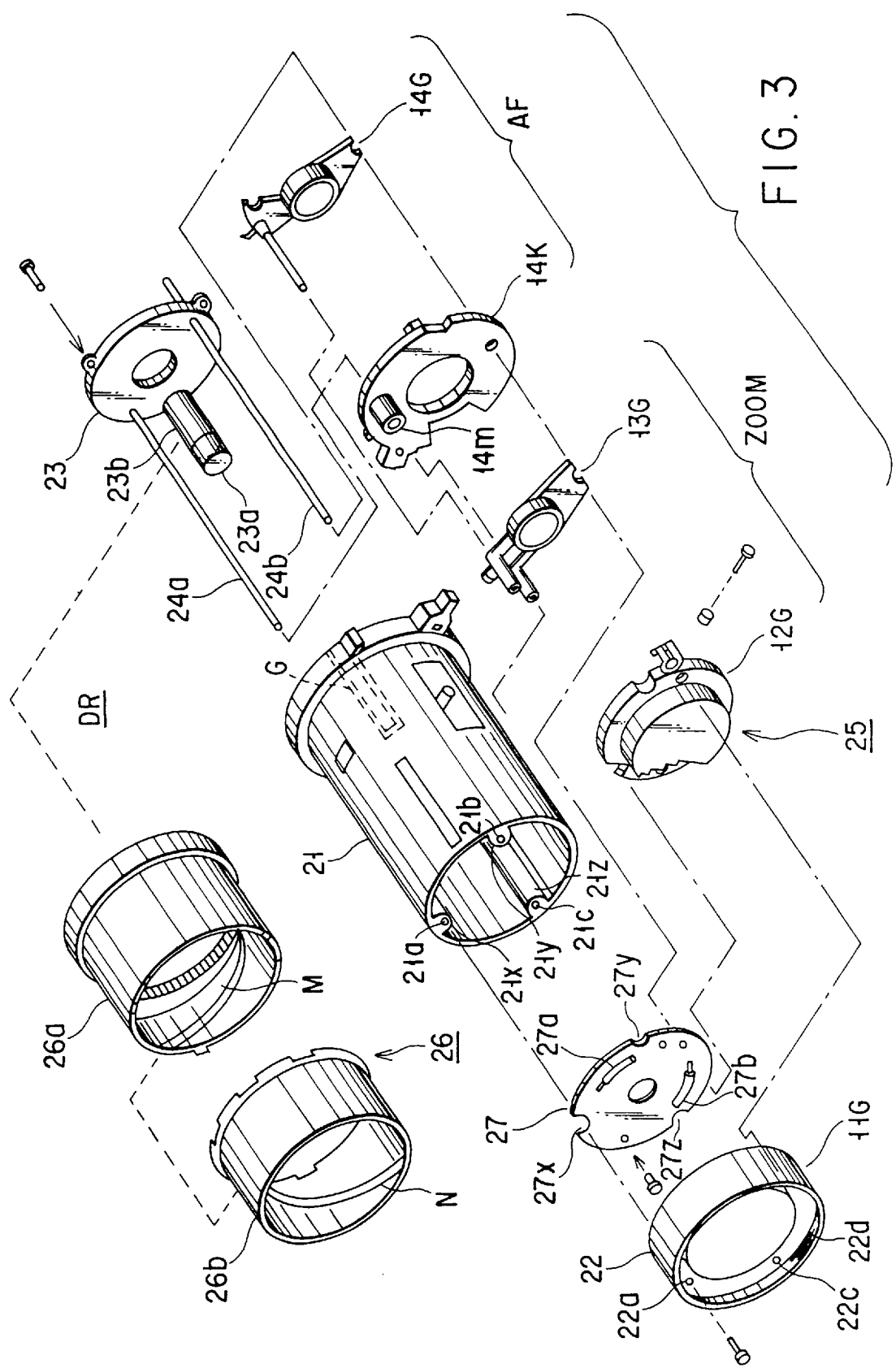
FIG. 3 is an exploded, perspective view of a lens barrel including an optical system built in the camera body of the electronic image pickup apparatus according to the embodiment of the present invention.

A cylindrical case shown in a central portion of FIG. 3 is a holding barrel 21, both ends of which are open. A front lens barrel 22 is fixed to the front open end of the holding barrel 21, which is shown on the left side of FIG. 3, by a fixing means such as a screw, while a mounting substrate 23 is fixed to the rear open end of the holding barrel 21, which is shown on the right side of FIG. 3, by the fixing means.

One end of each of paired guide shafts 24a and 24b is inserted into a hole of the mounting substrate 23 and adhesively fixed thereto, and the other end thereof is fitted and supported by the rim portion of the front lens barrel 22. These paired guide shafts 24a and 24b are arranged in the holding barrel 21 in parallel to the optical axis.

A moving lens frame group 25 (12G, 13G, 14G, etc.) is guided by the guide shafts 24a and 24b and moved slidably in the optical axis direction in the holding barrel 21. As will be clearly described later, the moving lens frame 14G moves along the guide shafts 24a and 24b, together with the moving lens frames 12G and 13G, while it is mounted on a moving frame 14K. For convenience of description, in this embodiment, an optical element with a lens is represented by "G" and that without a lens is represented by "K". The components 12G and 13G are used chiefly for zooming (ZOOM), and the components 14K and 14G are for auto-focus (AF), though they are not necessarily differentiated definitely. The components 14K and 14G are driven so as to relatively brought close to and separated from each other by means of an AF motor 14m mounted on the moving frame 14K, thereby adjusting the focus automatically.

A plurality of ribs 21x, 21y and 21z (three ribs in this embodiment) are provided on the inner surface of the holding barrel 21 in parallel to the optical axis. These ribs 21x, 21y and 21z extend from the front open end to the inner portion thereof, which is beyond a light quantity adjusting unit 27 or an aperture shutter unit for adjusting a quantity of light passing therethrough.

The ribs 21x, 21y and 21z therefore function as guide rails for the light quantity adjusting unit 27. The light quantity adjusting unit 27 is shaped like a disk and has notch portions 27x, 27y and 27z on its periphery. If the notched portions are engaged with the ribs 21x, 21y and 21z, respectively to slide the light quantity adjusting unit 27 using the ribs as a guide, the light quantity adjusting unit 27 can easily be inserted inwardly from the front open end of the holding barrel 21.

The ribs 21x, 21y and 21z are provided at one end with screw holes 21a, 21b and 21c for screwing the front lens barrel 22.

The front lens barrel 22 has mounting threads 22d formed on the inner surface thereof to detachably mount optical components, such as an adapter lens and a filter from outside. The front lens barrel 22 also has screw inserting holes 22a to 22c corresponding to the screw holes 21a to 21c of the ribs 21x, 21y and 21z.

A cam cylinder 26, which is the principal element constituting a lens moving mechanism DR, is fitted on the outer surface of the holding barrel 21 such that it can slidably contact and rotate thereon. The cam cylinder 26 is designed to move the moving lens frame group 25 back and forth in the optical axis direction, and includes a first cam cylinder 26a having a convex cam M on its inner surface and a second cam cylinder 26b having a concave cam N thereon which are coupled to each other. The cam cylinder 26 is rotated by power transmitted from a driving source, which is constituted of a zooming motor 23a and a reduction mechanism 23b fixed on the mounting substrate 23, by means of a power transmission mechanism.

Figure 4:
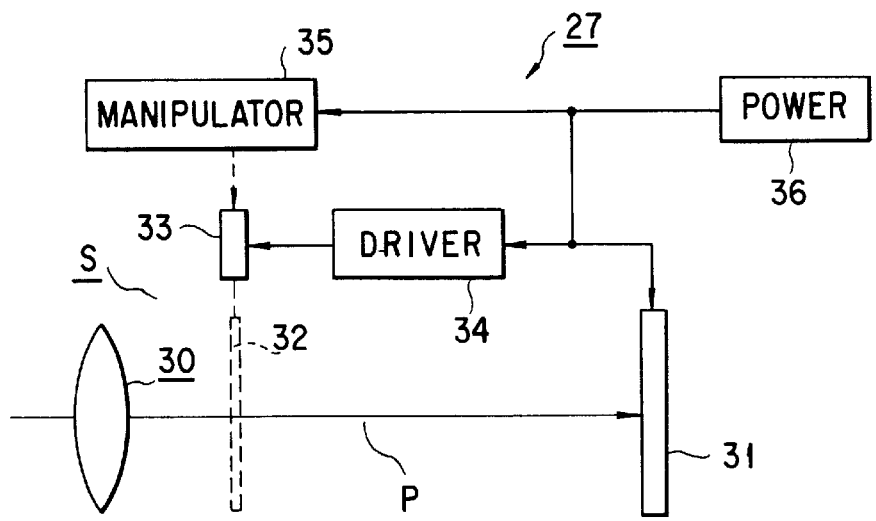
FIG. 4 is a block diagram showing a schematic structure of a shutter drive operating system in an aperture shutter unit of the electronic image pickup apparatus according to the embodiment of the present invention.

FIG. 4 is a diagram showing the structure of a drive operating system of the light quantity adjusting unit (aperture shutter unit) 27. A shutter S comprises a shielding member 32 which can be inserted into and removed from an optical path P of an optical system 30 for forming an image of an object on a light receiving surface of an image pickup element 31, an inserting/removing mechanism 33 for inserting or removing the shielding member 32 into or from the optical path P, and a driver 34 for driving the inserting/removing mechanism 33.

The inserting/removing mechanism 33 can be driven by a manipulator 35, as well as by the driver 34. The manipulator 35 is constructed so as to work by turning off a power switch (not shown) in cooperation with a stop sequence executed before the power supply from a power source 36 for the image pickup device is stopped.

Figure 5:
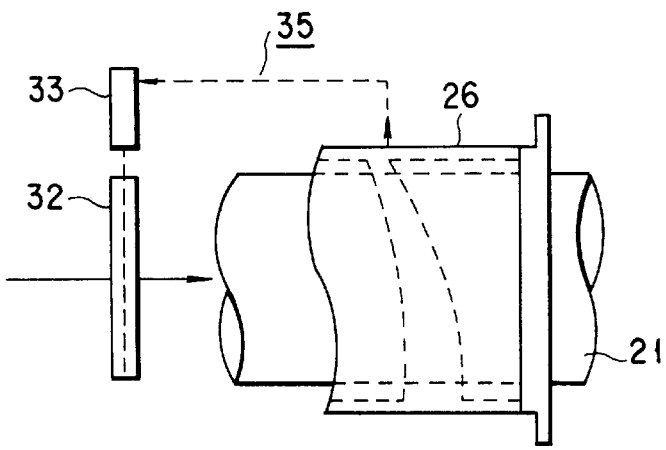
FIG. 5 is a diagram showing a concrete structure of a shutter drive operating system in the aperture shutter unit of the electronic image pickup apparatus according to the embodiment of the present invention.

FIG. 5 shows a concrete example of the manipulator 35. As shown in FIG. 5, the manipulator 35 is constituted by the combination of a part of the inserting/removing mechanism 33 and a part of the cam cylinder 26 for moving the movable lens flame (not shown in FIG. 5), provided in the holding barrel 21, in the optical axis direction. With this structure, when the cam cylinder 26 performs a return operation for moving the zoom optical system 30 to an initial position by the stop sequence, the inserting/removing mechanism 33 moves the shielding member 32 in the shielding direction. The cam cylinder 26 is set so as to operate the shielding member 32 in the shielding direction at a position where the moving lens frame group 25 is located outside the widest-angle position, i.e., the initial position of the zoom optical system 30.

Figure 6:
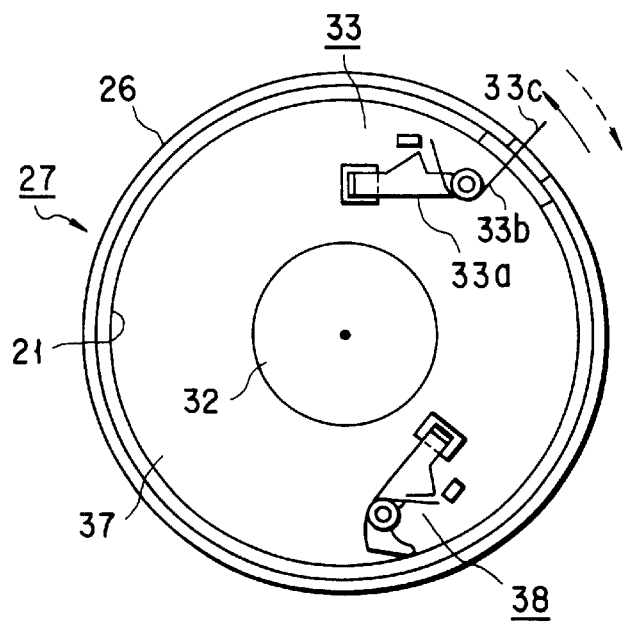
FIG. 6 is a diagram showing a concrete structure of an inserting/removing mechanism in the aperture shutter unit of the electronic image pickup apparatus according to the embodiment of the present invention.

As shown in FIG. 6, the inserting/removing mechanism 33 is mounted on an mounting substrate 37 of the light quantity adjusting unit 27 (aperture shutter unit). The inserting/removing mechanism 33 comprises: an operation lever 33a, which is rotated forward and backward about an axis, for inserting or removing the shielding member 32 into or from the optical path P; a toggle spring 33b for providing rotation behavior of rotating the operation lever 33a about the axis in the direction (indicated by the broken arrow) in which the shielding member 32 is opened; and an arm portion 33c attached to an end of the toggle spring 33b so as to be externally operable. The arm portion 33c is led out through a slit opening provided in the holding barrel 21, and engaged with an engaging hole of the cam cylinder 26.

When the cam cylinder 26 is fully rotated in the direction indicated by the solid arrow, i.e., in the direction toward a wide-angle position, the arm portion 33c is rotated in the direction indicated by the solid arrow at a predetermined rotation angle. As a result, the shielding member 32 performs a shielding operation outside the widest-angle position. This state is maintained even after the power supply is stopped. In FIG. 6, a reference numeral 38 denotes an aperture opening/closing mechanism. The aperture opening/closing mechanism 38, having a structure substantially the same as that of the inserting/removing mechanism 33, operates a aperture member (not shown) arranged on the shielding member 32. The inserting/removing mechanism 33 and the aperture opening/closing mechanism 38 are driven and controlled by solenoid plungers 27a and 27b, serving as the driver 34, both attached to the rear side of the mounting substrate 37.

Features of the Embodiment

[1] An electronic image pickup apparatus according to the embodiment comprises a shutter S having a shielding member 32 which can be inserted into or removed from an optical path P of an optical system 30 for forming an image of an object on a light receiving surface of an image pickup element 31; an inserting/removing mechanism 33 for inserting or removing the shielding member 32 into or from the optical path P; a driver 34 for driving the inserting/removing mechanism 33; and a manipulator 35 for operating the inserting/removing mechanism 33 by a driving system other than the driver 34.

In this electronic image pickup apparatus, the shielding plate 32 for controlling exposure can be closed at a desired time without supplying electricity to the driver 34. Therefore, discoloration of the color filter attached to the image pickup element 31 can be prevented by causing the shielding plate 32 to perform a shield operation in, for example, the non-photographing time.

[2] In the electronic image pickup apparatus according to the embodiment as described in above item [1], the manipulator 35 is operated in cooperation with a stop of power supply from a power source 36 of the electronic image pickup apparatus.

In this electronic image pickup apparatus, since the shielding plate 32 is automatically closed when the power source 36 of the apparatus body is turned off, the shielding plate 32 is closed without failure and the discoloration preventing function is reliably performed.

[3] An electronic image pickup apparatus according to the embodiment comprises a shutter S having a shielding member 32 which can be inserted into or removed from an optical path P of an optical system 30 including moving lens frames 12G, 13G, 14G, etc. for forming an image of an object on a light receiving surface of an image pickup element 31; an inserting/removing mechanism 33 for inserting or removing the shielding member 32 into or from the optical path P; a driver 34 for driving the inserting/removing mechanism 33; and a manipulator 35 for operating the inserting/removing mechanism 33 by a driving system other than the driver 34, so that the inserting/removing mechanism 33 is operated to move the shielding member 32 in a shielding direction in cooperation with a return operation of a cam member 26 for moving the moving lens frames 12G, 13G, 14G, etc. in a direction of an optical axis.

In this electronic image pickup apparatus, the shielding plate 32 is closed in cooperation with the movable optical system. Therefore, the shielding operation of the shielding plate 32 can be performed by an exclusive driving system other than the driver 34 without using an additional mechanism or driver.

[4] In the electronic image pickup apparatus according to the embodiment as described in above item [3], the optical system 30 is a zooming optical system, and the cam member 26 is constructed to move the shielding member 32 in the shielding direction at a position where the moving lens frames 12G, 13G, 14G, etc. are located outside the widest-angle position of the zoom optical system 30.

In this electronic image pickup apparatus, the zoom optical system is kept at the wide-angle position when the power source 36 is OFF. Therefore, at the start of the next photographing, the scope including an object observed through a finder, a monitor, etc. Thus, the operability of the apparatus is much improved.

[5] In the electronic image pickup apparatus according to the embodiment as described in above item [3], the inserting/removing mechanism 33 comprises: an operation lever 33a, which is rotated forward and backward, for operating the shielding member 32; a toggle spring 33b having rotation behavior for rotating the operation lever in an opening direction in which the shielding member is opened; and an arm portion 33c attached to an end of the toggle spring 33b so as to be externally operable, wherein the arm portion 33c of the toggle spring is pressed by the cam member 26, thereby moving the shielding member 32 in the shielding direction.

In this electronic image pickup apparatus, external operation force is applied to the arm portion 33c of the toggle spring 33b. Therefore, even if over-stroke or the like occurs, a positional error can be absorbed by elastic deformation of the arm portion 33c. In addition, since the arm portion 33c can be elastically deformed suitably in an assembly process, the apparatus can be assembled easily.

What is claimed is:

1. An electronic image pickup apparatus comprising a shutter and a power supply having:

a shielding member which can be inserted into or removed from an optical path of an optical system including a plurality of moving lens frames for forming an image of an object on a light receiving surface of an image pickup element;

an inserting/removing mechanism for inserting or removing the shielding member into or from the optical path;

a driver for driving the inserting/removing mechanism; and a manipulator including a cooperation mechanism provided so as to operate the inserting/removing mechanism by a driving system other than the driver, said cooperation mechanism being operated in cooperation with a member which performs a return operation when the power supply for the image pickup apparatus is stopped thereby driving the inserting/removing mechanism;

said manipulator being capable of inserting the shielding member into the optical path of the optical system, thereby preventing discoloration of a color filter attached to the light receiving surface of the image pickup element.

2. The electronic image pickup apparatus according to claim 1, wherein the member which performs a return operation when the power supply for the image pick-up apparatus is stopped is a cam member which moves the moving lens frame in a direction of an optical axis.

3. The electronic image pickup apparatus according to claim 2, wherein the optical system is a zooming optical system, and the cam member is constructed to move the shielding member in the shielding direction at a position where the moving lens frames are located outside a widest-angle position of the zooming optical system.

4. An electronic image pickup apparatus comprising a shutter having:

a shielding member which can be inserted into or removed from an optical path of an optical system including a plurality of moving lens frames for forming an image of an object on a light receiving surface of an image pickup element;

an inserting/removing mechanism for inserting or removing the shielding member into or from the optical path, the inserting/removing mechanism including:

an operation lever, which is rotated forward and backward, for operating the shielding member;

a toggle spring for providing rotation behavior of rotating the operation lever in an opening direction in which the shielding member is opened; and an arm portion attached to an end of the toggle spring so as to be externally operable, wherein the arm portion of the toggle spring is pressed by the cam member, thereby moving the shielding member in a shielding direction;

a driver for driving the inserting/removing mechanism; and a manipulator for operating the inserting/removing mechanism by a driving system other than the driver, so that the inserting/removing mechanism is operated to move the shielding member in a shielding direction in cooperation with a return operation of a cam member for moving the lens frames in a direction of an optical axis, said manipulator being capable of inserting the shielding member into the optical path of the optical system, thereby preventing discoloration of a color filter attached to the light receiving surface of the image pickup element.

5. An electronic image pickup apparatus comprising a shutter having:
- a shielding member which can be inserted into or removed from an optical path of an optical system for forming an image of an object on a light receiving surface of an image pickup element;
- an inserting/removing mechanism for inserting or removing the shielding member into or from the optical path;
- a driver for driving the inserting/removing mechanism;
- a manipulator for operating the inserting/removing mechanism by a driving system other than the driver, said manipulator being capable of inserting the shielding member into the optical path of the optical system, thereby preventing discoloration of a color filter attached to the light receiving surface of the image pickup element; and
- an opening/closing mechanism for opening or closing an aperture member.

6. An electronic image pickup apparatus comprising a shutter having:
- a shielding member which can be inserted into or removed from an optical path of an optical system including a plurality of moving lens frames for forming an image of an object on a light receiving surface of an image pickup element;
- an inserting/removing mechanism for inserting or removing the shielding member into or from the optical path;
- a driver for driving the inserting/removing mechanism;
- a, manipulator for operating the inserting/removing mechanism by a driving system other than the driver, so that the inserting/removing mechanism is operated to move the shielding member in a shielding direction in cooperation with a return operation of a cam member for moving the lens frames in a direction of an optical axis, said manipulator being capable of inserting the shielding member into the optical path of the optical system, thereby preventing discoloration of a color filter attached to the light receiving surface of the image pickup element; and
- an opening/closing mechanism for opening or closing an aperture member.

7. An electronic image pickup apparatus comprising a shutter having:
- a shielding member which can be inserted into -or removed from an optical path of an optical system including a plurality of moving lens frames for forming an image of an object on a light receiving surface of an image pickup element;
- an inserting/removing mechanism for inserting or removing the shielding member into or from the optical path, the inserting/removing mechanism including:
  - an operation lever, which is rotated forward and backward, for operating the shielding member;
  - a toggle spring for providing rotation behavior of rotating the operation lever in an opening direction in which the shielding member is opened; and
  - an arm portion attached to an end of the toggle spring so as to be externally operable, wherein the arm portion of the toggle spring is pressed by the cam member, thereby moving the shielding member in a shielding direction;
- a driver for driving the inserting/removing mechanism; and
- a manipulator for operating the inserting/removing mechanism by a driving system other than the driver, so that the inserting/removing mechanism is operated to move the shielding member in a shielding direction in cooperation with a return operation of a cam member for moving the lens frames in a direction of an optical axis.

8. An electronic image pickup apparatus comprising a shutter and a power supply having:
- a shielding member which can be inserted into or removed from an optical path of an optical system including a plurality of moving lens frames for forming an image of an object on a light receiving surface of an image pickup element;
- an inserting/removing mechanism for inserting or removing the shielding member into or from the optical path;
- a driver for driving the inserting/removing mechanism, and
- a manipulator including a cooperation mechanism provided so as to operate the inserting/removing mechanism by a driving system other than the driver, said cooperation mechanism being operated in cooperation with a member which performs a return operation based on a stop sequence executed before the power supply for the image pickup apparatus is stopped, thereby driving the inserting/removing mechanism.

9. An electronic image pickup apparatus comprising a shutter having:
- a shielding member which can be inserted into or removed from an optical path of an optical system for forming an image of an object on a light receiving surface of an image pickup element;
- an inserting/removing mechanism for inserting or removing the shielding member into or from the optical path;
- a driver for driving the inserting/removing mechanism; and
- a manipulator including a cooperation mechanism provided so as to operate the inserting/removing mechanism by a driving system other than the driver, said cooperation mechanism being operated in cooperation with a member which performs a return operation when the power supply for the image pickup apparatus is stopped, thereby driving the inserting/removing mechanism;
- said manipulator being capable of inserting the shielding member into the optical path of the optical system, thereby preventing discoloration of a color filter attached to the light receiving surface of the image pickup element.

* * * * *

UNITED STATES PATENT AND TRADEMARK OFFICE
CERTIFICATE OF CORRECTION

PATENT NO. : 6,665,005 B1
DATED : December 16, 2003
INVENTOR(S) : Higuchi et al.

It is certified that error appears in the above-identified patent and that said Letters Patent is hereby corrected as shown below:

Column 1,
Line 22, after the word "normally", delete "close" and insert therefor -- closed --.
Line 23, after the word "camera,", delete "perform" and insert therefor -- performs --.

Column 4,
Line 5, after the word "lens", delete "flame" and insert therefor -- frame --.
Line 17, after the word "on", delete "an" and insert therefor -- a --.
Line 41, after the word "operates", delete "a" and insert therefor -- an --.

Column 5,
Line 43, after the word "scope", delete "including" and insert therefor -- includes --.
Line 47, after the word "item", delete "[3]" and insert therefor -- [3] -- without bold.

Column 7,
Line 30, delete the phrase "a, manipulator" and insert therefor -- a manipulator --.
Line 46, after the word "into", delete "-or" and insert therefor -- or --.

Signed and Sealed this

Fifteenth Day of June, 2004

JON W. DUDAS
*Acting Director of the United States Patent and Trademark Office*